United States Patent [19]

Stephens et al.

[11] 4,166,269

[45] Aug. 28, 1979

[54] TEMPERATURE COMPENSATED PIEZORESISTIVE TRANSDUCER

[75] Inventors: Mark L. Stephens, Campbell; Paul R. Gray, Orinda, both of Calif.

[73] Assignee: Signetics Corporation, Sunnyvale, Calif.

[21] Appl. No.: 883,486

[22] Filed: Mar. 6, 1978

[51] Int. Cl.² .............................................. G01L 1/22
[52] U.S. Cl. ........................................... 338/3; 338/5
[58] Field of Search ......................... 338/3, 2, 5, 47, 4; 357/26

[56] References Cited

U.S. PATENT DOCUMENTS

| | | | |
|---|---|---|---|
| 3,697,918 | 10/1972 | Orth et al. | 338/3 |
| 4,050,049 | 9/1977 | Youmans | 338/47 |
| 4,071,838 | 1/1978 | Block | 338/47 |

Primary Examiner—C. L. Albritton
Attorney, Agent, or Firm—Jerry A. Dinardo; Jack Oisher

[57] ABSTRACT

A temperature compensated piezoresistive transducer includes a silicon body having a major top surface and an under surface. The body has generally parallel spaced first and second elongate slots formed therein extending through said top and under surfaces to define a center portion between said slots and first and second outer portions at the outward edge of the respective slots. The center portion is adapted to receive pressure to be measured. The body has an additional slot extending through the top and bottom surfaces and extending around the first, second and center portions to define the outer periphery of a transducer membrane with portions of the body remaining to integrally support the membrane. Plural piezoresistive elements having elongate and transverse dimensions are formed on the membrane. The elements are arrayed to receive compressive and tensile stress when pressure is applied.

4 Claims, 3 Drawing Figures

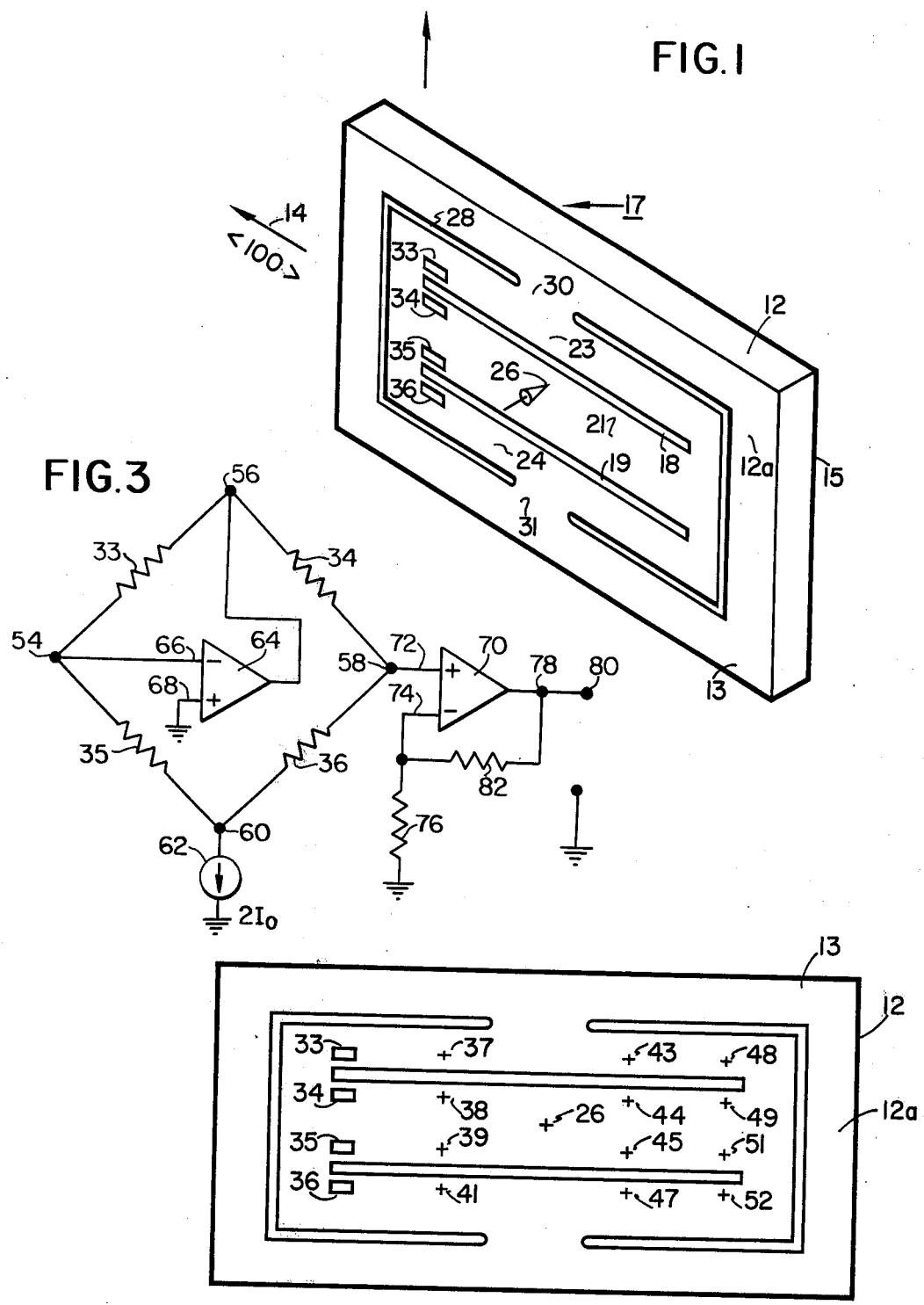

TEMPERATURE COMPENSATED PIEZORESISTIVE TRANSDUCER

BACKGROUND OF THE INVENTION

Although temperature compensated piezoresistive transducers have been provided, the structures are excessively complex, utilize circular restrained diaphragms which have temperature sensitive radial forces, and lack physical and electrical symmetry necessary for proper compensation. U.S. Pat. No. 3,697,918 to Orth discloses a radial structure. Other radial structures are disclosed in U.S. Pat. No. 3,388,597 to D. W. Bargen, et al., U.S. Pat. No. 3,537,319 to Alexander J. Yerman, U.S. Pat. No. 3,230,763 to N. Frantzis, U.S. Pat. No. 3,820,401 to Edward T. Lewis, U.S. Pat. No. 3,772,628 to Joe B. Underwood, et al., U.S. Pat. No. 3,456,226 to Gerald L. Vick, and in the article entitled "Strain Gauge Made of Single Wafer", *Electronics,* Oct. 17, 1966, page 155. There is a need for a temperature compensated piezoresistive transducer which is capable of physical and electrical symmetry and which is free of radial temperature effects.

OBJECTS AND SUMMARY OF THE INVENTION

A temperature compensated piezoresistive transducer includes a silicon body having a major top surface and an under surface, with the body having generally parallel spaced first and second elongate slots formed therein. The slots extend through the top and under surfaces to define a center portion between said slots and first and second outer portions at the outward edge of the respective slots. The center portion is adapted to receive pressure to be measured. The body has an additional slot extending through the top and bottom surfaces and extending around said first, second and center portions to define the outer periphery of a transducer membrane. Portions of said body remain to integrally support the membrane. Plural piezoresistive elements having elongate and transverse dimensions are formed on the membrane. The elements are arrayed to receive compressive and tensile stress when pressure is applied.

In general, it is an object of the present invention to provide a temperature compensated piezoresistive transducer which is useful for force transducer applications.

More particularly, it is an object of the present invention to provide a temperature compensated piezoresistive transducer having greatly improved temperature characteristics.

Another object of the invention is to provide a temperature compensated piezoresistive transducer having plural piezoresistive elements which are arrayed and in a position to receive pressure applied and to minimize temperatures effects.

BRIEF DESCRIPTION OF THE DRAWINGS

FIG. 1 is an isometric view of a temperature compensated piezoresistive transducer in accord with the present invention.

FIG. 2 is a full length view of a temperature compensated transducer together with piezoresistive elements formed thereon in accord with the present invention.

FIG. 3 is a schematic diagram showing the bridge circuit utilized in the invention.

DESCRIPTION OF THE PREFERRED EMBODIMENT

Referring to FIG. 1, the piezoresistive transducer structure includes a silicon body 12 which has a major top surface 13 and an under surface 15. The body 12 may be formed from a larger silicon wafer having a planar surface 13 and an under surface 15 generally parallel to surface 13. A process for forming the transducer structure is described in U.S. Pat. No. 4,050,049 to Youmans. In general, body 12 has the surface plane 13 in a predetermined crystalline orientation, which is the <100> orientation, the orientation of the crystalline axis being indicated by the arrow 14. The back side 15 is etched toward planar surface 13 to provide a relatively thin transducer membrane 17. Generally parallel spaced first and second elongate slots 18 and 19 are formed extending through said top surface 13 and the under surface 15 and preferably having their elongate dimensions parallel to the crystalline axis 14. The slots 18 and 19 define a center transducer portion 21 between the slots and a first outer portion 23 and a second outer portion 24 at the outward edge of the respective slots 18 and 19. Center portion 21 is adapted to receive, such as by direct physical contact, pressure at the area indicated by force arrow 26. Body 12 has an additional circumferential slot 28 extending through top surface 13 and bottom surface 15. The circumferential slot 28 extends around the first, second and center portions 23, 24 and 21 to define the outer periphery of the transducer membrane generally shown as 17. Slot 28 is interrupted; that is, portions of the body are allowed to remain at 30 and 31 to integrally support the membrane from the frame portion 12a of body 12.

Plural piezoresistive elements 33, 34, 35, and 36 have elongate dimensions, shown in FIG. 1 as being parallel to elongate slots 18 and 19, and transverse dimensions generally at right angles to elongate slots 18 and 19. Means, not shown, may be provided for connecting the elements as impedance arms of an electrical transducer bridge. The connecting means may comprise elongated conductors connecting the piezoresistive elements to conductive bonding pads located on the frame portion 12a, with the elongate conductors and bonding pads being insulated from the silicon body 12 by an insulating layer of silicon dioxide. A connection means of this kind is disclosed in application Ser. No. 852,909 of Warren C. Rosvold, filed Nov. 18, 1977. The bridge may be of the type disclosed in application Ser. No. 870,620 of Mark L. Stephens and Paul R. Gray, filed Jan. 19, 1978.

It has been found that elements 33-36 may be arrayed to receive compressive and tensile stress when pressure is applied and thus provide an output electrical signal corresponding to the pressure applied at force arrow 26 to the transducer center portion 21. Prior piezoresistive elements were conventionally located orthogonally one to the other to provide a stress sensitive resistor bridge. However, it has been found that the temperature dependent stress at the silicon body and silicon dioxide generally formed as a passivating layer on the body has caused temperature signals to add directly to the stress information. It will now be shown that careful selection of the four piezoresistive element locations, by placing two in transducer areas under tension and two in areas under compression, provides a substantially improved device.

Referring to FIG. 2, it is to be noted that for a given force applied at the area 26 in the direction of the arrow, elements 34 and 35 are positioned in tensile stress areas, and elements 33 and 36 are positioned in compressive stress areas. Similarly, areas 37 and 41, 43 and 47, and 49 and 51 are likewise tensile stress areas under the same given applied force. On the other hand, areas 38 and 39, 44 and 45, and 48 and 52 are compressive stress areas like those of 33 and 36. It is to be observed that any four areas of those shown may be utilized as positions for the piezoresistive elements. Further, all piezoresistors may have the same orientation, that is, all transverse dimensions being parallel to the elongate slots 18 and 19 as opposed to those now shown wherein the elongate dimensions of the elements are parallel to slots 18 and 19. Moreover, any four areas from the FIG. 2 map may be chosen so long as the two tensile are utilized together with two compressive. However, the inward areas 34, 35, 38, 39, 44, 45, 49, and 51 are preferable because of the higher stress available and thus the corresponding higher output signal.

The bridge circuit utilized in the present invention is shown in FIG. 3. The impedance bridge circuit includes piezoresistive elements 33, 34, 36, 35 connected as arms of a bridge in a series loop with first, second, third and fourth bridge terminals 54, 56, 58 and 60 serially defined at the connections between the respective elements.

The bridge circuit further includes current source means 62 connected between terminal 60 and ground and having a magnitude of $2I_0$. Drive means 64 is included having an inverting input 66 connected to terminal 54, a non-inverting input 68 connected to ground or common, and an output connected to terminal 56. The drive means may be one of many types of operational amplifiers well known in the art, such as Signetics part number LM101. The bridge circuit further includes an amplifier 70, which may likewise be of the LM101 type. Amplifier 70 has a non-inverting input 72 connected to terminal 58, an inverting input 74 connected to ground or common via a resistor 76, and an output 78 connected to output terminal 80. Resistor 76 is known in the art as $R_s$. A feedback resistor 82, referred to in the art as $R_f$, is connected between the output 78 and the inverting input 74 of the amplifier 70.

In operation, when a force is applied at area 26 (FIG. 1), elements 33 and 36 may be in compression and elements 34 and 35 in tension for a given physical displacement. Accordingly, this causes corresponding resistance arm changes in the bridge arms of FIG. 3. The bridge imbalance at terminal 54 is sensed at input 66 of amplifier 64 and amplifier 64 provides a corresponding output to drive terminal 56 such that terminal 54 is held at ground potential. The output signal at 58 is amplified by another amplifier 70 which in turn provides a single ended amplified output signal at 80 corresponding to the physical displacement of the transducer membrane.

Experimental observation and verification was carried out utilizing two separate transducers with the results indicated in the table below. For the conventional positioning, piezoresistor R1 was positioned at area 43, piezoresistor R2 at 37, both having their elongate dimension parallel to slot 18. Further, piezoresistor R3 was positioned at area 41 and piezoresistor R4 at area 47, both with their elongate dimensions at right angles to slot 19. An additional transducer membrane was utilized having piezoresistors R1 and R2 at 43 and 37 respectively, both having their elongate dimension parallel to slot 18. Further, piezoresistors R3 and R4 were positioned at areas 36 and 52 with their elongate dimensions also parallel to elongate slot 19.

The following data was obtained:

|  | Conventional | |
|---|---|---|
|  | 28° C. | 77° C. |
| R1 | 11,637 Ω | 12,462 Ω |
| R2 | 11,506 | 12,320 |
| R3 | 11,960 | 12,850 |
| R4 | 11,963 | 12,849 |

For the transducer is accord with the present invention:

|  | 28° C. | 77° C. |
|---|---|---|
| R1 | 11,627 Ω | 12,458 Ω |
| R2 | 11,497 | 12,319 |
| R3 | 11,487 | 12,325 |
| R4 | 11,588 | 12,407 |

Substituting these values into the bridge equation yields:

| | $\frac{\Delta R}{R} = \frac{R_1 R_2 - R_4 R_3}{(R_1 + R_4)(R_2 + R_3)}$ | |
|---|---|---|
| | $\frac{\Delta R}{R_{28° C.}}$ | $\frac{\Delta R}{R_{77° C.}}$ |
| Conventional | $1.6580 \times 10^{-2}$ | $1.8173 \times 10^{-2}$ |
| Experimental | $1.0515 \times 10^{-3}$ | $9.0245 \times 10^{-4}$ |

| | $\left| \frac{\Delta R}{R_{28° C.}} - \frac{\Delta R}{R_{77° C.}} \right|$ | $\frac{\left| \frac{\Delta R}{R_{28° C.}} - \frac{\Delta R}{R_{77° C.}} \right|}{\Delta T° C.}$ |
|---|---|---|
| Conventional | $1.5933 \times 10^{-3}$ | Normal 31.8 ppm/C.° |
| Experimental | $1.5504 \times 10^{-4}$ | Experimental 3.1 ppm/C.° |

Thus it has been determined that the experimental results show an improvement of approximately 10, that is an order of magnitude, in the temperature coefficient possible with the new technique. Thus it is apparent that there has been provided a temperature compensated piezoresistive transducer having greatly improved temperature characteristics. Further, a temperature compensated piezoresistive transducer provides plural piezoresistive elements which are arrayed and in a position to receive pressure applied and to minimize temperature effects.

What is claimed is:

1. A temperature compensated piezoresistive transducer comprising,
    a semiconductor body having a major top surface and a bottom surface, said body having generally parallel spaced first and second elongate slots formed therein extending through said top and bottom surfaces to define a center portion extending between said elongate slots and first and second outer portions extending from the outward edge respectively of each of said elongate slots, said center portion being adapted to receive pressure to be measured, said body having two additional opposing U-shaped slots extending through said top and bottom surfaces and extending around said first, second and center portions to define the outer periphery of a transducer membrane with portions of said body between said U-shaped slots remaining to integrally support the membrane,
    at least four piezoresistive elements having elongate and transverse dimensions formed on said membrane, said piezoresistive elements being arrayed to receive compressive and tensile stress when pressure is applied and being connected as arms of a piezoresistive transducer bridge in which two opposing arms of the bridge are constituted by two of said piezoresistive elements which experience compression when a force is applied to the center portion of said membrane and in which the other two opposing arms of the bridge are constituted by the remaining two of said piezoresistive elements which experience tension when said force is applied to said center portion, all of said four piezoresistive elements having their elongate dimensions parallel to each other.

2. A transducer as in claim 1 wherein said elongate slots are formed along one crystalline axis of said body and said elements' elongate dimensions are positioned along a second axis at right angles to said one axis.

3. A transducer as in claim 1 wherein said elongate slots are formed along one crystalline axis of said body and said elements' elongate dimensions are parallel to said one axis.

4. A transducer as in claim 3, wherein a first pair of said piezoresistive elements are positioned on opposite sides of one of said elongate slots near an end portion thereof and a second pair of said piezoresistive elements are positioned on opposite sides of the other one of said elongate slots near an end portion thereof.

* * * * *